United States Patent [19]

Lin

[11] Patent Number: 4,969,377
[45] Date of Patent: Nov. 13, 1990

[54] TRANSMISSION THROTTLE-VALVE LINKAGE FOR VEHICLE TRACTION CONTROL

[75] Inventor: William C. W. Lin, Troy, Mich.

[73] Assignee: General Motors Corporation, Detroit, Mich.

[21] Appl. No.: 366,041

[22] Filed: Jun. 13, 1989

[51] Int. Cl.$^5$ ............................................. F02D 35/00
[52] U.S. Cl. ........................................ 74/864; 74/865; 74/877; 123/396
[58] Field of Search ................. 123/396, 400, 401; 180/197; 74/864, 865, 877, DIG. 1; 403/166, 229

[56] References Cited

U.S. PATENT DOCUMENTS

| | | | |
|---|---|---|---|
| 3,343,858 | 9/1967 | Rice | 403/229 |
| 3,785,224 | 1/1974 | Will | 74/865 |
| 3,941,143 | 3/1976 | Iijima | 74/865 X |
| 3,958,542 | 5/1976 | Tanner | 123/396 |
| 4,274,305 | 6/1981 | Roushdy | 74/470 X |
| 4,337,743 | 7/1982 | Mattson | 123/396 |
| 4,389,910 | 6/1983 | Lockhart | 74/843 |
| 4,541,052 | 9/1985 | McCulloch | 364/431.07 |
| 4,711,140 | 12/1987 | Younger | 74/865 |
| 4,747,461 | 5/1988 | Hayn et al. | 180/197 |
| 4,785,691 | 11/1988 | Paperhagen et al. | 74/877 |
| 4,834,044 | 5/1989 | Maas | 123/396 X |
| 4,860,848 | 8/1989 | Barth et al. | 123/336 X |

FOREIGN PATENT DOCUMENTS 3021116 12/1981 Fed. Rep. of Germany.
55-63918 5/1980 Japan ..................... 123/396

Primary Examiner—Leslie A. Braun
Assistant Examiner—Benjamin Levi
Attorney, Agent, or Firm—Mark A. Navarre

[57] ABSTRACT

A transmission throttle valve linkage assembly (15) interconnects an engine throttle motor (M) and a transmission throttle valve (TV) to provide a synchronous interconnection between the two when the hydraulic pressure operating on the throttle valve (TV) is above a predetermined level but which allows for independent operation between the two when the hydraulic pressure is below the predetermined level. The transmission throttle valve linkage assembly (15) has a first linkage member (22) operatively connected to the engine throttle motor (M) and a second linkage member (24) operatively connected to the valve operating mechanism (48) so as to control, or be controlled by, the position of a plunger (50) within the throttle valve (TV). The linkage members (22, 24) move synchronously when the transmission throttle valve (TV) pressure is above a predetermined level and move independently when the pressure is below that predetermined level.

3 Claims, 2 Drawing Sheets

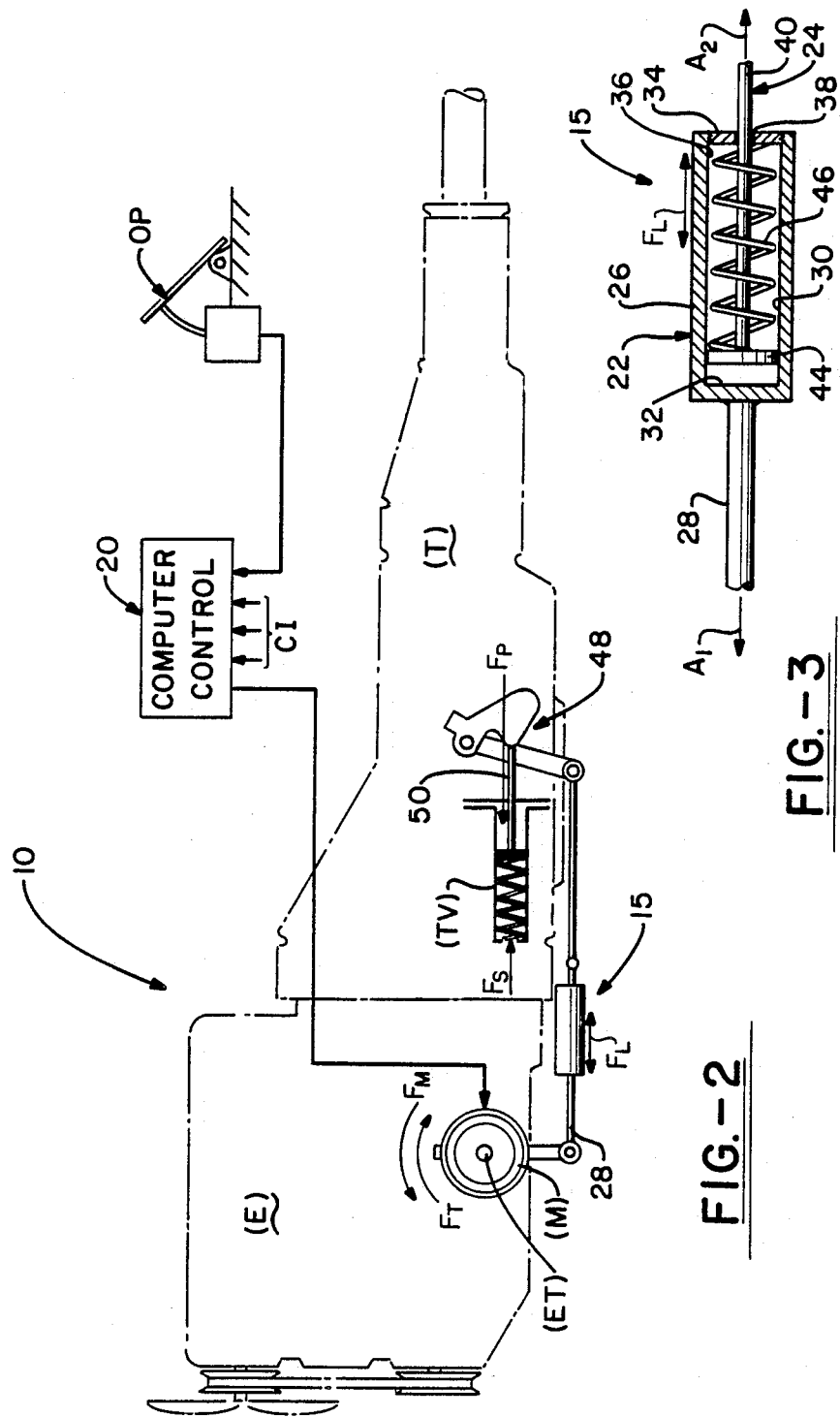

TRANSMISSION THROTTLE-VALVE LINKAGE FOR VEHICLE TRACTION CONTROL

TECHNICAL FIELD

The present invention relates generally to vehicular automatic transmissions. More particularly, the present invention relates to a throttle valve linkage for power train control of vehicle traction. Specifically, the present invention relates to a throttle valve linkage which will allow the use of a smaller motor for engine throttle control while maintaining a correct transmission gear shift schedule of a nonelectronic controlled automatic transmission.

BACKGROUND OF THE INVENTION

The gear shift schedule for the automatic transmission of a vehicle is conventionally determined by two inputs: the engine power level and the transmission output speed. The shift schedule is executed by a control logic system located within the transmission. A governor unit, also within the transmission, provides the input to the control logic system based upon transmission output speed, while the input as to the engine power level is provided by the disposition of the engine throttle, which is linked to the transmission throttle valve. A typical prior known transmission throttle valve linkage is diagrammatically illustrated in FIG. 1A of the drawings wherein the vehicle engine (E) drives a transmission (T) and the throttle control of the engine is accomplished by linkage interconnecting an operator's accelerator pedal (OP) to the transmission throttle valve (TV) through the engine throttle (ET).

In a more advanced vehicular power train control system, an electric motor (M) is used for driving the engine throttle (ET), and a representative implementation of this prior known arrangement is illustrated in FIG. 1B of the drawings. In this embodiment the electric motor (M) drives the engine throttle (ET) based upon the operator's accelerator pedal position (OP) and other "condition inputs" (CI) fed into a computer processing unit. This motor controlled engine throttle is effective in vehicular traction control, because the engine throttle opening can be reduced in response to condition inputs (CI) in order to eliminate excessive wheel spin, as, for example, in the situation when an operator attempts to effect rapid vehicular acceleration on a slippery road surface.

One might reasonably expect that for an ideal coordination of the vehicle engine with its transmission, and particularly with a hydraulically controlled transmission, the transmission throttle valve (TV) should be connected to the engine throttle (ET), as illustrated in FIG. 1B. However, various difficulties are encountered with this arrangement. For example, the motion of the throttle valve (TV) plunger is determined by the balance of three forces: (1) $F_S$, which is the throttle valve spring force; (2) $F_C$, which is the engine throttle motor (M) force through the transmission (TV) linkage; and, (3) $F_P$, which is the hydraulic pressure force of the throttle valve. For the throttle valve plunger to advance, it is required that:

$$F_C > F_S - F_P.$$

The motor (M), which actuates the engine throttle (ET), in turn, needs to generate a force $F_M$ which is sufficient to drive both the engine throttle (ET) and the transmission throttle valve (TV) linkage, and this relationship may be stated by the mathematical expression:

$$F_M = F_C + F_T + \text{rotor inertial reaction}$$

In the above relationship, $F_T$ is the force required to drive the engine throttle (ET) which is usually counterrotated by a shut-off spring to return the throttle to a closed position when the engine throttle motor (M) is not being actuated to open the engine throttle (ET). Finally, if the transmission throttle valve linkage is arranged as illustrated in FIG. 1B of the drawings, then the motor (M) must be of such a size as to deliver a force $F_M$ wherein:

$$F_M > F_R + F_T + F_S - F_P$$

In the above relationship $F_R$ is the maximum inertial reaction force for maximum acceleration of the rotor in motor (M), and the condition of the hydraulic throttle valve pressure $F_P$ in the transmission throttle valve (TV) becomes an important consideration.

Conventionally, all hydraulic pressures within a hydraulically operated automatic transmission for vehicles are generated by a hydraulic pump which is driven directly by the vehicle engine (E). Accordingly, before the engine can start driving the pump, the transmission throttle valve pressure $F_P$ must be zero. Therefore, in order for the engine throttle motor (M) to advance the engine throttle (ET) for starting, the motor (M) must deliver a force that may be stated by the following mathematical expression:

$$F_M > F_R + F_T + F_S$$

The aforesaid relationship will require a much large engine throttle motor (M) than needed for running the power train under normal conditions. In practice, and to save the cost of a larger engine throttle motor (M), the performance is compromised by attaching the transmission throttle valve (TV) linkage to the vehicle accelerator pedal (OP) as illustrated in FIG. 1C of the drawings. In this configuration, a smaller engine throttle motor (M) may be used but by doing so it has been found that the vehicle transmission shift schedule will not be correct under those conditions where wheel anti-spin is desired. In such a condition, the vehicle engine speed may tend to increase, when, to the contrary, it should be reduced by at least partially retarding the engine throttle setting.

SUMMARY OF THE INVENTION

In view of these and other difficulties with the prior art throttle valve linkage configurations, it is, therefore, a primary object of the present invention to provide an improved linkage assembly between the engine throttle and the transmission throttle valve which will allow the use of a smaller motor for advancing the engine throttle.

It is another object of the present invention to provide an improved motor driven engine throttle-to-transmission throttle valve linkage, as above, which will maintain a correct transmission shift schedule under all conditions.

These and other objects of the invention, as well as the advantages thereof over existing and prior art forms, which will be apparent in view of the following detailed specification, are accomplished by means hereinafter described and claimed.

In general, a motor vehicle system for traction control embodying the concepts of the present invention employs an electric engine throttle motor, a transmission throttle responsive to hydraulic pressure and a unique linkage assembly interconnecting the engine throttle motor to the transmission throttle valve.

The unique linkage assembly employs opposed first and second linkage members. The first linkage member responsive to the engine throttle motor. The second linkage member is connected to the transmission throttle valve so as to control, or to be controlled by, the position of a plunger within the throttle valve. Means are associated with both the first and second linkage members to effect a synchronous motion between the first and second linkage members when the transmission throttle valve pressure is above a predetermined level and to effect an independent operation of the engine throttle motor when the pressure is below the predetermined level.

One exemplary linkage assembly embodying the concepts of the present invention, and intended for use in a motor vehicle is deemed sufficient to effect a full disclosure of the subject invention. The exemplary linkage assembly is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 2 is a diagrammatic illustration of a vehicle throttle valve linkage embodying the concepts of the present invention; and FIG. 3 is a longitudinal in cross-section of an exemplary throttle valve linkage assembly which may be incorporated in the structure of the present invention.

DESCRIPTION OF AN EXEMPLARY EMBODIMENT

Figure 1A:
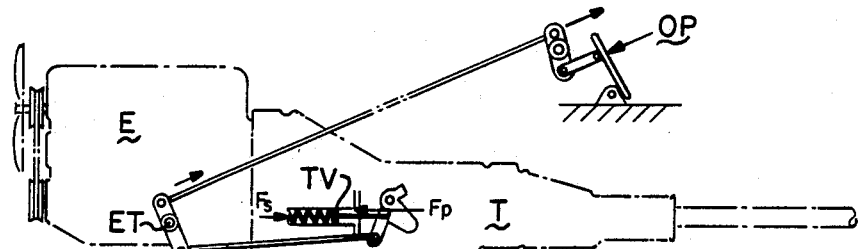
FIGS. 1A, 1B and 1C are diagrammatic illustrations of the prior art transmission throttle valve implementations.
Figure 1B:
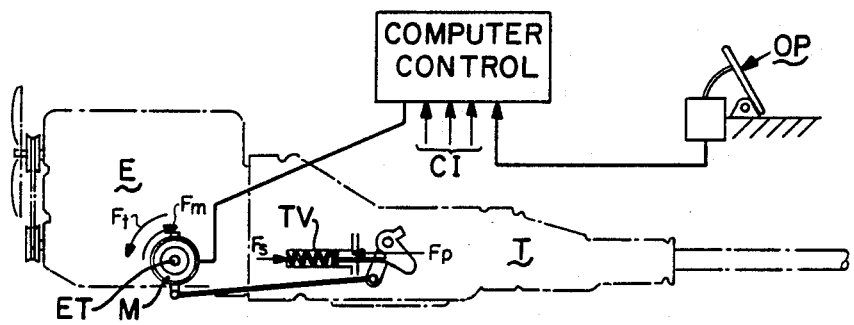
Figure 1C:
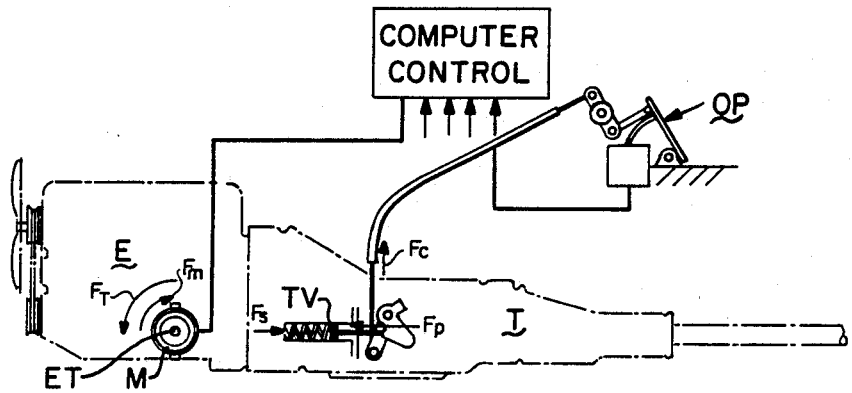

One representative form of a vehicular traction control system employing a motor controlled throttle which provides traction control, and which embodies the concepts of the present invention, is designated generally by the numeral 10 on FIG. 2 hereof. A transmission throttle valve linkage assembly, indicated generally by the numeral 15, is shown as it may be implemented for use in conjunction with a vehicle engine (E) and transmission (T), the engine and transmission being illustrated in phantom line and being depicted solely for the purpose of environment and not in any way intended to restrict, or otherwise limit, the scope of the invention.

The vehicular system depicted includes a computer control processor 20 which may receive, in a conventional manner, not only various operating inputs for control of the engine throttle (ET) but also "condition inputs" (CI) responsive to the position of the operator's accelerator pedal (OP). The engine throttle (ET) is controlled by the computer control processor 20. The processor operates an electrical throttle motor (M) that is connected to the transmission throttle valve (TV) through the linkage assembly 15. The transmission throttle valve (TV) selects the correct transmission shift schedule for proper vehicle operation.

The assembly 15 may comprise any of several known linkage members which will function in the manner to be described hereinafter. However, for the purpose of this description an exemplary linkage assembly 15 is illustrated in FIG. 3 of the drawings. More specifically, the assembly 15 may comprise substantially opposed, first and second linkage members 22 and 24, respectively. The first linkage member 22 generally comprises a cylindrical housing 26 which is connected to the engine throttle motor (M) by way of an extension arm 28. The cylindrical housing 26 circumscribes a blind bore 30 that does not penetrate the closed end 32 thereof, and a closure plate 34 is received within the mouth 36 of the bore 30. The closure plate 34 may be threaded, or otherwise retained, within the mouth 36 of the bore 30. A small, central aperture 38 penetrates the closure plate 34, and the stem 40 of a pull rod assembly which comprises the second linkage member 24, reciprocates freely through the aperture 38. The stem 40 of the pull rod assembly, or second linkage member, 24 terminates in a head 44 which reciprocates within the bore 30 in cylindrical housing 26. A compression spring 46 surrounds the stem 40 within the bore 30 and extends between the head 44 and the closure plate 34 to bias the head 44 of the pull rod assembly 24 toward the closed end 32 of the cylindrical housing 26—i.e., in the direction of the arrow $A_1$. The stem 40 of the pull rod assembly 24 is connected to the transmission throttle valve (TV) through the valve operating mechanism indicated generally by the numeral 48. The valve operating mechanism 48, of course, operates the throttle valve plunger 50 in a conventional manner. It will be appreciated from the foregoing description that a force in the direction of arrow $A_2$, with the cylindrical housing 26 being restrained, will effect compression of the spring 46 between the head 44 and the closure plate 34.

The purpose of the compression spring 46 is to apply a pre-load force $F_L$ that is larger than the force difference between the throttle valve (TV) spring force $F_S$ acting on the valve plunger 50 and the opposing hydraulic pressure force $F_P$ acting on the throttle valve (TV), but the pre-load force $F_L$ must be smaller than the throttle valve spring force $F_S$ itself—i.e.:

$$F_S > F_L > F_S - F_P$$

Further, the maximum travel of the pull rod assembly 24 must be large enough for a sufficient engine throttle (ET) opening to allow for engine start up.

In a well-designed transmission, the difference in the throttle valve (TV) spring force $F_S$ and the hydraulic pressure force $F_P$ is kept very small and thus the relationship $F_S - F_P$ is small compared to the throttle operating force $F_T$. As a result, the requirement for preloading the spring 46 to a force $F_L$ only adds a small burden on the engine throttle motor (M). In this circumstance, the throttle motor (M) needs only to deliver a force stated by the following mathematical expression:

$$F_M > F_T + F_L$$

before the transmission throttle valve hydraulic pressure $F_P$ builds up. Substituting for the pre-load force $F_L$, it can be seen that the throttle motor (M) need only deliver a force defined by the following mathematical expression:

$$F_M > F_T + F_S - F_P$$

even after the throttle valve hydraulic pressure $F_P$ builds up. The size of the engine throttle motor (M), therefore, will be determined by $F_T+F_L$ and it can thus be appreciated why a small engine throttle motor is sufficient.

Finally, and most importantly, the reason why this present invention maintains the proper transmission shift schedule may be described as follows. Once the transmission throttle valve hydraulic pressure $F_P$ builds up, the compression spring 46 in the linkage assembly 15 cannot be compressed. This is so because the spring pre-load force $F_L$ is larger than the difference between the throttle valve spring force $F_S$ and the throttle valve hydraulic pressure force $F_P$. In this condition the transmission throttle valve (TV) and the engine throttle (ET), via the throttle motor (M), operate synchronously, and this results in a correct transmission shift. The only occasion that these two members will not move synchronously is at the moment when the vehicle is standing still and the engine is to be started. In this condition the pump which supplies pressurized hydraulic transmission fluid is not being driven by the engine, and the hydraulic pressure in the transmission throttle valve is zero. In that situation, obviously, no shift schedule is required.

While certain details have been shown and described for the purpose of illustrating the invention, it will be apparent to those skilled in this art that various changes and/or modifications may be made thereto without departing from the spirit or scope of the invention.

As should now also be apparent, the present invention not only discloses a throttle-to-transmission valve linkage that will require a smaller motor for engine throttle control but also one that will likewise accomplish the other objects of the invention.

The embodiments of the invention in which an exclusive property or privilege is claimed are defined as follows:

1. In a motor vehicle system for traction control including an electric engine throttle motor, a transmission throttle valve responsive to hydraulic pressure, and a linkage interconnecting the engine throttle motor to the transmission throttle valve, the linkage comprising, in combination:

first means connected, and responsive, to the engine throttle motor;

second means connected to the transmission throttle valve in a manner to control, or be controlled by, the position of a plunger within the throttle valve; and, third means mounted in association with the first and second means to effect a synchronous motion between the first and second means when the transmission throttle valve hydraulic pressure is above a predetermined level and to effect an independent operation of the engine throttle motor when the pressure is below the predetermined level.

2. In a motor vehicle system for traction control including an engine throttle, a computer controlled electric throttle motor to operate the engine throttle, a transmission throttle valve having a plunger responsive to opposed spring and hydraulic pressure forces, and a linkage interconnecting the electric throttle motor and the transmission throttle valve plunger, the linkage comprising, in combination:

a first linkage member connected and responsive to the electric throttle motor;

a second linkage member operatively connected to the transmission throttle valve plunger to control, or to be controlled by, the position of the plunger; and, means associated with both said first and second linkage members to permit independent operation of the first linkage member relative to the second linkage member when the hydraulic pressure force acting on the transmission throttle valve is below a predetermined level and to effect synchronous operation of the first and second members, and thus also between the electric throttle motor and the transmission throttle valve, when the hydraulic pressure force is above the predetermined level.

3. In a motor vehicle system for traction control including an engine throttle, a computer controlled electric throttle motor to operate the engine throttle, a transmission throttle valve having a plunger responsive to both a spring force and a throttle valve hydraulic pressure force, and a control linkage interconnecting the electric throttle motor and the transmission throttle valve plunger, the linkage comprising in combination:

a housing member having a central bore, a closed end of the housing being connected to an output of the electric throttle motor while an opposite end presents an aperture into the bore;

a pull rod assembly being reciprocative within the bore and having a head and a stem;

said stem extending out of the housing through said aperture operatively to engage the throttle valve plunger; and, a pre-loaded spring member carried within the housing bore which forces the head of the pull rod assembly toward the closed end of the housing to permit the housing and pull rod assembly to move synchronously when the throttle valve hydraulic pressure force is above a predetermined level, said pre-loaded spring member being compressed when the throttle valve hydraulic pressure force falls below the predetermined level to effect independent movement of said housing with respect to said pull rod assembly.

* * * * *